United States Patent [19]
Katsumata et al.

[11] Patent Number: 5,378,748
[45] Date of Patent: Jan. 3, 1995

[54] POLYACETAL RESIN COMPOSITION EXHIBITING REDUCED SURFACE GLOSS CHARACTERISTICS AND MOLDED ARTICLES THEREOF

[75] Inventors: Tohru Katsumata; Nobuyuki Matsunaga, both of Shizuoka, both of Japan

[73] Assignee: Polyplastics Co., Ltd., Osaka, Japan

[21] Appl. No.: 991,241

[22] Filed: Dec. 16, 1992

[30] Foreign Application Priority Data

Dec. 27, 1991 [JP] Japan .................. 3-346780

[51] Int. Cl.$^6$ .................. C08K 5/69; C08L 67/02; C08L 59/02
[52] U.S. Cl. .................. 524/196; 524/539; 524/542; 525/399; 525/405
[58] Field of Search .............. 524/196, 197, 539, 542; 525/399, 400

[56] References Cited

U.S. PATENT DOCUMENTS

| | | | |
|---|---|---|---|
| 3,364,157 | 1/1968 | Halek et al. | 525/154 |
| 3,595,937 | 7/1971 | Weissermel et al. | 525/420 |
| 3,697,624 | 10/1972 | Braunstein | 525/399 |
| 4,169,867 | 10/1979 | Burg et al. | 525/417 |
| 4,978,725 | 12/1990 | Reske et al. | 525/399 |

FOREIGN PATENT DOCUMENTS

| | | |
|---|---|---|
| 0397493 | 11/1990 | European Pat. Off. |
| 2110417 | 6/1972 | France. |
| 2449343 | 4/1976 | Germany ................. 525/400 |

OTHER PUBLICATIONS

Patent Abstracts of Japan, vol. 10, No. 345 (C-386) 20 Nov. 1986; & JP-A-61 148 221 (Mitsubishi Gas Chem Co) 5 Jul. 1986.

*Primary Examiner*—Peter Szekely
*Attorney, Agent, or Firm*—Nixon & Vanderhye

[57] ABSTRACT

Polyacetal resin compositions capable of providing a molded article having exceptionally reduced surface gloss characteristics but which maintain the inherent mechanical properties and moldability of polyacetal resin include (A) 100 parts by weight of a polyacetal base resin and, incorporated therein, (B) between 1 to 50 parts by weight of a polyalkylene terephthalate copolymer having a melt flow temperature of 210° C. or below, and (C) between 0.1 to 10 parts by weight of an isocyanate or isothiocyanate compound, or a derivative thereof.

4 Claims, No Drawings

POLYACETAL RESIN COMPOSITION EXHIBITING REDUCED SURFACE GLOSS CHARACTERISTICS AND MOLDED ARTICLES THEREOF

FIELD OF INVENTION

The present invention relates generally to the field of low gloss polyacetal resin compositions. More specifically, the present invention relates to novel polyacetal resin compositions in which a specific polyester resin and an isocyanate compound are each incorporated thereinto so as to reduce the surface gloss of the composition while maintaining the other desirable mechanical and physical properties inherent with polyacetal resin generally.

BACKGROUND AND SUMMARY OF THE INVENTION

Polyacetal resin is used in diverse fields as an engineering plastic due to its excellent physical properties, such as mechanical, electrical and chemical properties (e.g., chemical and heat resistances). However, the identification of new end-use applications for polyacetal resins often requires further property alterations and/or enhancements.

One such property that is needed when polyacetal resin is employed to form molded parts used for automotive trim or optical instruments is a relatively low surface gloss. A low surface gloss will thus reduce the light reflectivity property of the molded part. As a result, low surface gloss on molded parts will tend to cause less eye irritation (i.e., since less light will be reflected from the part's surface). Furthermore, low surface gloss on molded parts fabricated from engineering plastics tends to impart a more aesthetically pleasing high-grade appearance to the part.

An ability to "engineer" the surface gloss characteristics would also be beneficial in instances where molded parts fabricated from polyacetal resin (which inherently exhibits a relatively high surface gloss) are used in cooperation with molded pairs formed of other non-polyacetal resins. That is, it would be especially desirable to reduce the surface gloss of polyacetal resin to an extent where it is substantially equivalent to the molded parts of non-polyacetal resin in which it is cooperatively used. An inability to date to reduce the surface gloss of polyacetal resins by controlled amounts so that it is visually imperceptible with parts molded from non-polyacetal resins has thus been one barrier to using polyacetal resin in end-use applications (e.g., as parts for electric and electronic devices) where the polyacetal part will be visible.

Attempts in the past to reduce the inherently high surface gloss of polyacetal resins have included incorporating inorganic filler material, such as calcium carbonate or talc, in a polyacetal base resin. However, large amounts of such inorganic filler material must typically be added to the polyacetal base resin before the desired low surface gloss appearance is realized. The addition of relatively large amounts of inorganic filler material, however, is disadvantageous since it has a tendency to reduce the mechanical characteristics (especially elongation and toughness) normally associated with polyacetal resins. Thus, for example, the mechanical properties may be degraded by the addition of relatively large amounts of filler material to the point where molded parts of such a highly filler-loaded polyacetal resin break during assembly or when dropped.

Another technique to reduce the surface gloss of molded articles has been attempted whereby the surfaces of a mold have been texturized (i.e. "grained") so that the texture is transferred to the surface of the molded article. In the specific case of polyacetal resins, however, due to their relatively high crystallinity, satisfactory reduction in surface gloss by graining has not been achieved.

Accordingly, what has been needed in this art are polyacetal resin compositions which exhibit their inherent desirable mechanical and physical properties while also having reduced surface gloss characteristics. It is toward providing such polyacetal resin compositions that the present invention is directed.

Broadly, the present invention relates to polyacetal resin compositions having reduced surface gloss characteristics by blending with a polyacetal base resin, a specific polyester resin and a specific isocyanate compound. More particularly, the present invention is directed to novel polyacetal resin compositions which include (A) 100 parts by weight of a polyacetal base resin, (B) between 1 to 50 parts by weight of a polyalkylene terephthalate copolymer having a melt flow temperature of 210° C. or below, and (C) between 0.1 to 10 parts by weight of an isocyanate or isothiocyanate compound, or modifications thereof. Molded articles formed of such compositions exhibit desirable reduced surface gloss characteristics.

Further aspects and advantages of this invention will become more clear after careful consideration is given to the detailed description of the preferred exemplary embodiments thereof which follow.

DETAILED DESCRIPTION OF THE PREFERRED EXEMPLARY EMBODIMENTS

The polyacetal base resin that may be used in the compositions of the present invention is a normally solid, high-molecular weight polymer mainly comprised of repeating oxymethylene ($-CH_2O-$) units. The polyacetal base resin may be either a polyoxymethylene homopolymer or a copolymer, terpolymer or block copolymer containing a small amount of other monomeric units in addition to oxymethylene units. The polyacetal resin may be linear, branched, or cross-linked. Furthermore, the degree of polymerization of the polyacetal resin is not particularly limited, provided that it is normally solid (i.e., is a solid at room (20° C.) temperature).

The polyalkylene terephthalate copolymer that may be used as the component (B) in the compositions of the present invention is a polyester which is produced by subjecting an acid component comprising 100 to 50 mole % of terephthalic acid and 0 to 50 mole % of an aliphatic or alicyclic dicarboxylic acid having six or more carbon atoms or an aromatic dicarboxylic acid other than terephthalic acid, to copolycondensation with an alkylenediol component having 2 to 8 carbon atoms. The polyalkylene terephthalate copolymer with have a melt flow temperature of 210° C. or below.

Examples of the acid component other than terephthalic acid to be used herein include aliphatic dicarboxylic acids having six or more carbon atoms, specific examples of which include adipic, azelaic, sebacic decanedicarboxylic, dodecanedicarboxylic, hexadecanedicarboxylic and dimer acids. Examples of alicyclic dicarboxylic acids having six or more carbon atoms include 1,4-cyclohexanedicarboxylic, 1,3-cyclohexanedicarboxylic and 1,2-cyclohexanedicarboxylic acids. Examples of aromatic dicarboxylic acids other than terephthalic acid include isophthalic, phthalic, naphthalenedicarboxylic, diphenoxyethanedicarboxylic and diphenyldicarboxylic, diphenyletherdicarboxylic, diphenylsulfonedicarboxylic acids. Furthermore, it is also possible to use other difunctional carboxylic acids, for example, aliphatic dicarboyxlic acids such as hexahydroterephthalic and hexahydroisophthalic acids, and hydroxy acids such as p-β-hydroxyethoxybenzoic, p-hydroxybenzoic and hydroxycaproic acids.

It is also possible to use such dicarboxylic acid components during polymerization in the form of their ester-forming derivatives, for example, a lower alcohol ester such as a dimethyl ester. These acid components may be used as a mixture of two or more of the same. Among the above acid components, adipic, sebacic, isophthalic, naphthalenedicarboxylic and decanedicarboxylic acids are preferred.

The alkylenediol having 2 to 8 carbon atoms that may be used herein include 1,4-butanediol, ethylene glycol, trimethylene glycol, hexamethylene glycol, decamethylene glycol, neopentyl glycol, 1,1-cyclohexanedimethylol, diethylene glycol, 1,4-cyclohexanedimethylol, 2,2-bis(4-β-hydroxyethoxyphenyl)propane and bis(4-β-hydroxyethoxyphenyl) sulfone. A mixture of two or more such alkylenediols may also be sued. Particularly preferred alkylenediols include 1,4-butanediol, ethylene glycol, diethylene glycol, and 1,4-cyclohexanedimethylol. Still preferred are 1,4-butanediol, ethylene glycol and an alkylenediol partially replaced by at least one member selected from ethylene glycol (in the case when 1,4-butanediol is used), diethylene glycol and 1,4-cyclohexanedimethylol.

The polyalkylene terephthalate polymer that may be used as the component (B) in the compositions of the present invention is a copolyester which is produced by copolymerizing the above-noted acid component with the above-noted diol component and has a melt flow temperature of 210° C. or below, preferably 190° C. or below. When the melt flow temperature is above 210° C., it is difficult to perform kneading and the resultant composition does not exhibit any satisfactory effect. Any polyalkylene terephthalate can be used as the component (B) in the compositions of the present invention provided that it has a melt flow temperature of 210° C. or below.

Preferred examples of the copolymer component (A) include copolyesters prepared from an acid component comprising terephthalic acid partially replaced by at least one member selected among isophthalic, napthalenedicarboxylic and adipic acids, and a diol component comprising 1,4-butanediol, ethylene glycol or a diol component partially replaced by at least one member selected among ethylene glycol (in the case of the use of 1,4-butanediol), diethylene glycol and 1,4-cyclohexanedimethylol. A particularly preferred copolyester is one produced by copolymerizing an acid component comprising 90 to 60 mole % of terephthalic acid and 10 to 40 mole % of isophthalic acid with a diol component comprising a mixture of 1,4-butanediol and/or ethylene glycol with 1,4-cyclohexanedimethylol.

There is no particular limitation on the intrinsic viscosity (IV) of the copolyester resin. However, in order to obtain adequate dispersion in the polyacetal base resin, it is preferred to select the intrinsic viscosity in such a manner that the melt viscosity of the copolyester at the melt kneading temperature is as close to the melt viscosity of the polyacetal as is possible. Therefore, the intrinsic viscosity is preferably between 0.3 to 1.3, particularly preferably between 0.4 to 0.8. The intrinsic viscosity as specified herein is measured at 40° C. using a phenol/tetrachloroethane mixture as the solvent.

The polyalkylene terephthalate copolymer as the component (B) is present in the compositions of this invention is an amount between 1 to 50 parts by weight, preferably between 5 to 40 parts by weight, based on 100 parts by weight of the polyacetal base resin. When the amount of the component (B) is excessively small, no satisfactory effect in terms of surface gloss reduction can be attained. On the other hand, the addition of component (B) in an excessive amount has an adverse effect on the mechanical properties and heat-stability and results in poor composition extrudability.

Although the incorporation of the polyalkylene terephthalate copolymer as component (B) in the polyacetal base resin as component (A) serves to lower the surface gloss of the resulting molded article, it has a drawback that the extrudability is poor and the surface of the molded article becomes heterogeneous. The present invention is thus especially characterized in that an unmodified or modified isocyanate or isothiocyanate compound as component (C) is incorporated into the composition in addition to the components (A) and (B). The incorporation of component (C) contributes to an improvement in the composition's extrudability and, at the same time, can provide a molded article having a uniformly (i.e. homogeneously) reduced gloss as well as maintaining the well-balanced properties of the polyacetal resin.

The isocyanate or isocyanate compound or their derivatives that may be used as component (C) in the compositions of the present invention is preferably a compound represented by the general formula O═C═N—R—BN═C═O or S═C═N—R—N═C═S (wherein R represents a divalent organic group) or derivatives thereof.

Examples of the effective component include 4,4'-methylenebis(phenyl isocyanate), 2,4-tolylene diisocyanate, 2,6-tolylene diisocyanate, xylene diisocyanate, 1,6-hexamethylene diisocyanate, isophorone diisocyanate, 1,5-naphthalene diisocyanate, corresponding diisothiocyanates, their dimers and trimers, and compounds having an isocyanate group (—NCO) protected by some means. However, when various properties, such as the extent of discoloration during melt treatment, and safety in handling are taken into consideration it is preferred to use 4,4'-methylenebis(phenyl isocyanate), isophorone diisocyanate, 1,5-naphthalene diisocyanate, 1,6-hexamethylene diisocyanate, 2,4-tolylene diisocyanate and 2,6-tolylene diisocyanate and modifications (or derivatives) thereof such as their dimers and trimers.

The presence of the isocyanate or isothiocyanate compound as the component (C) during melt kneading serves to impart a uniform low gloss surface state while, at the same time, contributes to an enhancement in the strength and rigidity of the composition. From the viewpoint of an increase in the viscosity, this effect is believed to derive from a reaction of the component (C) with the polyacetal resin as the component (A) and/or the polyester resin as the component (B) during melt processing which enhances the affinity between the components (A) and (B) and, at the same time, compatibilizes the components (A) and (B) with each other, or to improve the adhesion at their interface.

The isocyanate or isothiocyanate compound or derivatives thereof as component (C) is present in the compositions of this invention in an amount between 0.1 to 10 parts by weight, preferably between 0.3 to 5 parts by weight, based on 100 parts by weight of the polyacetal base resin. When the amount of the component (C) is excessively small, the extrudability, gloss uniformity characteristics and the like are unsatisfactory. On the other hand, the addition of the component (C) in an excessive amount hinders the kneading operation.

From a practical viewpoint, the surface gloss of a molded article formed of the composition of the present invention is preferably 20% or less, particularly preferably 15% or less in terms of "glossiness" as determined by the method which will be described hereinafter. In this regard, the sophistication of the interior furnishings of automobiles in recent years and/or inorder to improve the touch of such interior furnishings, most interior parts of automobiles are subjected to graining called "leather graining" or "satin graining". As a result, it is necessary to lower the gloss on the mirror-finished surface and to impart a high degree of grain transferability to the surface of the molded article. In the compositions of the present invention, the modification of the surface of the polyacetal resin significantly lowers the surface mirror-finished gloss, and at the same time, contributes to a significant improvement in grain transferability so that the "glossiness" of the grained surface is even further reduced.

It is preferable to add various known stabilizers to the compositions of the present invention to enhance heat-stability. For this purpose, it is preferred to use known antioxidants, nitrogen compounds, alkali or alkaline earth metal compounds or other compounds either alone or as a mixture of two or more of the same. Furthermore, in the compositions of the present invention, it is also possible to add various types of carbon black or other various dyes and pigments to impart virtually any desired color to the composition.

At least one known additive selected among, for example, slip additives, nucleating agents, release agents, antistatic agents and other additives such as surfactants, weathering stabilizers, organic polymer materials other than the component (B) and inorganic and organic reinforcements may be added to the compositions of the present invention for the purpose of imparting desired properties to the composition according to its intended end-use application.

The compositions of the present invention can be prepared using facilities and methods generally employed in the preparation of synthetic resin compositions. Specifically, necessary components may be mixed, and kneaded and extruded on a single- or twin-screw extruded to provide pellets for molding. It is also possible to prepare the composition on a molding machine simultaneously with molding of desired parts. In order to enhance the effect of the present invention, it is preferred to pulverize, mix and melt-extrude part or the entirety of the resin components to form pellets for the purpose of improving the dispersion and blending of the individual components. Alternately, a part of the components constituting the composition (for example, a part of each of the components (A) and (C) may preliminarily be subjected to a melt-kneading treatment to form a master batch which is thereafter melt-kneaded with the remaining components to give a composition comprising the desired components.

The above-noted compounding components such as stabilizers and additives may be added at any stage. For example, such components may be added and mixed immediately before a final molding is obtained.

The resin composition according to the present invention can be molded by any conventional technique, such as of extruding, injection molding, compression molding, vacuum molding, blow molding and foam molding methods.

Although the compositions and molded articles according to the present invention have excellent properties as described above, heat-treatment at a temperature of 80° C. or above after the preparation of the composition or molded article is useful for further improving and stabilizing the properties.

As is apparent from the foregoing description, the composition of the present invention comprising a polyacetal resin and, incorporated therein, a specified polyalkylene terephthalate copolymer and a specified isocyanate compound exhibits exceptional extrudability and moldability characteristics, while also possessing significantly reduced surface gloss without detrimentally affecting the well-balanced mechanical properties of the polyacetal base resin.

Therefore, the polyacetal resin composition having a low surface gloss according to the present invention can be advantageously used in applications such as the interior furnishings of automobiles where high-grade quality and low light reflectivity are required (for example, regulator handles, interior clips and ventilator knobs), as well as optical instruments, building materials and domestic articles.

EXAMPLES

The present invention will be described in more detail with reference to the following non-limiting Examples.

In the following Examples and Comparative Examples, the term "parts" is by weight in all cases, and the surface state and mechanical properties are those evaluated according to the following techniques:

(1) Extrudability

The extrudability of the composition was evaluated according to the following ranks 1 to 3 with the smaller numerical value indicating better extrudability:
1. extrusion can be conducted easily.
2. extrusion is difficult to conduct and strand breakage is likely.
3. extrusion is impossible to conduct.

(2) Surface State and Appearance of Molding

The surface state was evaluated in terms of the matte state and the surface uniformity of the molding according to the following qualitative ranks 1 to 4, with the smaller numerical value indicating better surface uniformity and matte state:
1. the surface is uniform, and the matte state is good.
2. the surface luster is somewhat reduced but is nonuniform and rough.
3. the surface is nonuniformly mottled; that is, the surface has identifiable matte and lustrous regions.
4. the surface luster is minimally reduced, or the surface is substantially mottled with many regions where the luster is not reduced.

(3) Surface Gloss

A test piece (70 mm×40 mm×3 mm in thickness) molded under the following conditions on a mold having a mirror surface was subjected to gloss measurement at a 45°—45° reflection using a digital variable-angle gloss meter (UGV-40 manufactured by Suga Test Instruments Co., Ltd.) according to the gloss-measuring technique as specified in JIS K 7105.

Molding machine: IS80 manufactured by Toshiba Corp.

Molding conditions:

|  | Nozzle | C1 | C2 | C3 |
|---|---|---|---|---|
| Cylinder temp. (°C.) | 200 | 190 | 180 | 160 |
| Injection pressure | 650 (kg/cm$^2$) | | | |
| Injection rate | 1.0 (m/min) | | | |
| Mold temp. | 80 (°C.) | | | |

(4) Tensile Test and Bending Test

The tensile strength and elongation and bending strength were measured according to ASTM D638.

(5) Melt Flow Temperature

Pellets were packed in a flow tester (manufactured by Shimadzu Corp.) provided with a nozzle having a diameter of 1 mm, and the temperature was raised under a load of 500 kg to measure the temperature at which the flow began.

Examples 1 to 13

Various polyesters and various isocyanate compounds were blended with a polyacetal base resin as the component (A) according to the formulations specified in Table 1, mixed on a Henschel mixer and melt-kneaded on a 30-mm, twin-screw extruder to give a composition in pellet form. The pellets were then molded into a test piece on an injection molding machine under the above-described molding conditions. The test piece was subjected to the evaluation techniques described previously, with the results given in Table 1.

Comparative Examples 1 to 11

As noted in Table 2, a composition comprising a polyacetal base resin as the component (A) alone and compositions comprising a polyacetal resin and, added thereto, either a polyester as component (B) or an isocyanate compound as component (C) were prepared in the same manner as that of the Example 1 and then evaluated.

TABLE 1

|  |  | Ex. No. | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Polyacetal resin (pt. wt.) | | 100 | 100 | 100 | 100 | 100 | 100 | 100 | 100 | 100 | 100 | 100 | 100 | 100 |
| Polyester | type | B-1 | B-1 | B-2 | B-2 | B-2 | B-2 | B-2 | B-2 | B-2 | B-3 | B-3 | B-4 | B-5 |
| (note 1) | (pt. wt.) | 10 | 20 | 10 | 20 | 30 | 10 | 20 | 10 | 20 | 5 | 10 | 10 | 10 |
| Isocyanate | type | C-1 | C-1 | c-1 | C-1 | C-1 | C-1 | C-1 | C-2 | C-2 | C-1 | C-1 | C-1 | C-1 |
| (note 2) | (pt. wt.) | 3 | 3 | 3 | 3 | 3 | 1.5 | 4.5 | 3 | 3 | 3 | 3 | 3 | 3 |
| Extrudability | | 1 | 2 | 1 | 1 | 1 | 1 | 1 | 1 | 1 | 1 | 1 | 1 | 1 |
| Surface state | | 2 | 1 | 1 | 1 | 1 | 2 | 1 | 1 | 1 | 2 | 1 | 1 | 2 |
| Glossiness (%) (45°–45°) | | 16 | 6.1 | 9.5 | 7.1 | 4.1 | 13 | 5.0 | 9.9 | 7.5 | 18.5 | 9.0 | 8.2 | 12.9 |
| Tensile | strength (kg/cm$^2$) | 612 | 636 | 620 | 640 | 660 | 608 | 649 | 624 | 643 | 575 | 635 | 628 | 633 |
| strength test | elongation (%) | 29 | 21 | 27 | 20 | 19 | 24 | 22 | 26 | 22 | 32 | 22 | 26 | 28 |
| Bending strength | strength (kg/cm$^2$) | 925 | 985 | 934 | 1010 | 1150 | 899 | 1080 | 929 | 1070 | 881 | 949 | 927 | 929 |

TABLE 2

|  |  | Comp. Ex. No. | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Polyacetal resin (pt. wt.) | | 100 | 100 | 100 | 100 | 100 | 100 | 100 | 100 | 100 | 100 | 100 |
| Polyester | type | | B-1 | B-2 | B-2 | | | | | B-3 | B-4 | B-5 |
| (note 1) | (pt. wt.) | | 10 | 10 | 20 | | | | | 10 | 10 | 10 |
| Isocyanate | type | | | | | C-1 | C-1 | C-1 | C-2 | | | |
| (note 2) | (pt. wt.) | | | | | 3 | 1.5 | 4.5 | 3 | | | |
| Extrudability | | 1 | 3 | 3 | 3 | 1 | 1 | 2 | 2 | 3 | 3 | 3 |
| Surface state | | 4 | —* | 2 | —* | 4 | 4 | 4 | 4 | 3 | 3 | —* |
| Glossiness (%) (45°–45°) | | 77 | — | 12 | — | 32 | 38 | 26 | 54 | 15 | 18 | — |
| Tensile strength | strength (kg/cm$^2$) | 605 | — | 525 | — | 555 | 560 | 541 | 560 | 530 | 530 | — |
| test | elongation (%) | 60 | — | 15 | — | 78 | 76 | 66 | 69 | 10 | 12 | — |
| Bending strength | strength (kg/cm$^2$) | 860 | — | 825 | — | 860 | 851 | 831 | 851 | 811 | 804 | — |

*nonextrudable.

Note 1 (Polyester):

B-1: a modified polybutylene terephthalate copolymerized with 12.5% by mole, based on the whole acid component, of isophthalic acid. melt flow temp.: 205° C., IV: 0.7.

B-2: a modified polybutylene terephthalate copolymerized with 30% by mole, based on the whole acid component, of isophthalic acid. melt flow temp.: 160° C., IV: 0.5.

B-3: a modified polyethylene terephthalate copolymerized with 30% by mole, based on the whole acid component, of isophthalic acid. melt flow temp.: 155° C., IV: 0.6.

B-4: a modified polyethylene terephthalate copolymerized with 10% by mole, based on the whole diol component, of cyclohexanedimethanol and 20% by mole, based on the whole acid component, of isophthalic acid. melt flow temp.: 150° C., IV: 0.7.

B-5: a modified polybutylene terephthalate copolymerized with 30% by mole, based on the whole acid component, of naphthalenedicarboxylic acid. melt flow temp.: 190° C., IV: 0.6.

Note 2 (Isocyanate):

C-1: Isophorone diisocyanate (trimer).

C-2: 4,4'-methylenebis(phenyl isocyanate).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable polyacetal resin composition which when molded exhibits a surface gloss of 20% or less as measured at 45°—45° comprising a melt-blend or:
   (A) 100 parts by weight of a polyacetal resin;
   (B) between 1 to 50 parts by weight of a polyalkylene terephthalate copolymer having a melt flow temperature of 210° C. or below which is the polycondensation reaction product of (i) an acid component system consisting essentially of between 90 to 60 mole % of terephthalic acid and between 10 to 40 mole of at least one other acid component selected from the group consisting of isophthalic acid, napthalenedicarboxylic acid and adipic acid, and (ii) at least one diol component selected from the group consisting of 1,4-butanediol and ethylene glycol, which diol component may optionally be at least partially replaced by at least one other diol selected from the group consisting of diethylene glycol and 1,4-cyclohexanedimethylol; and
   (C) between 0.1 to 10 parts by weight of an unmodified or modified isocyanate or isothiocyanate compound.

2. A polyacetal resin composition according to claim 1, wherein component (C) is a diisocyanate or diisothiocyanate compound, or a dimer or trimer thereof.

3. A polyacetal resin composition according to claim 2, wherein component (C) is at least one member selected from the group consisting of 4,4'-methylenebis(phenyl isocyanate), isophorone diisocyanate, 1,5-naphthalene diisocyanate, 1,6-hexamethylene diisocyanate, 2,4-tolylene diisocyanate, 2,6-tolylene diisocyanate, and dimers and trimers thereof.

4. A molded article having a surface gloss of 20% or less as measured at 45°—45° which is formed of a polyacetal resin composition which consists essentially of:
   (A) 100 parts by weight of a polyacetal resin;
   (B) between 1 to 50 parts by weight of a polyalkylene terephthalate copolymer having a melt flow temperature of 210° C. or below which is the polycondensation reaction product of (i) an acid component system consisting essentially of between 90 to 60 mole % of terephthalic acid and between 10 to 40 mole of at least one other acid component selected from the group consisting of isophthalic acid, napthalenedicarboxylic acid and adipic acid, and (ii) at least one diol component selected from the group consisting of 1,4-butanediol and ethylene glycol, which diol component may optionally be at least partially replaced by at least one other diol selected from the group consisting of diethylene glycol and 1,4-cyclohexanedimethylol; and
   (C) between 0.1 to 10 parts by weight of an unmodified or modified isocyanate or isothiocyanate compound.

* * * * *